United States Patent [19]

Gamo et al.

[11] Patent Number: 5,281,390
[45] Date of Patent: Jan. 25, 1994

[54] METHOD OF PRODUCING HYDROGEN-STORING ALLOY AND ELECTRODE MAKING USE OF THE ALLOY

[75] Inventors: Takaharu Gamo, Fujiidera; Yoshio Moriwaki, Hirakata; Tsutomu Iwaki, Yawata; Akemi Shintani, Osaka, all of Japan

[73] Assignee: Matsushita Electric Industrial Co., Ltd., Osaka, Japan

[21] Appl. No.: 870,224

[22] PCT Filed: Dec. 28, 1989

[86] PCT No.: PCT/JP89/01319

§ 371 Date: Aug. 2, 1990

§ 102(e) Date: Aug. 2, 1990

[87] PCT Pub. No.: WO90/07585

PCT Pub. Date: Jul. 12, 1990

Related U.S. Application Data

[63] Continuation of Ser. No. 548,891, Aug. 2, 1990, abandoned.

[30] Foreign Application Priority Data

Jun. 28, 1988 [JP] Japan .................. 63-160056
Aug. 30, 1988 [JP] Japan .................. 63-215427
Dec. 29, 1988 [JP] Japan .................. 63-333227
Dec. 29, 1988 [JP] Japan .................. 63-333228

[51] Int. Cl.$^5$ ................ C22C 16/00; C22C 30/00
[52] U.S. Cl. .................... 420/422; 420/581; 420/900; 429/59; 429/221
[58] Field of Search ............ 420/125, 422, 581, 590; 429/59, 101, 221; 427/77, 123; 204/293

[56] References Cited

U.S. PATENT DOCUMENTS

| | | | |
|---|---|---|---|
| 4,144,103 | 3/1979 | Gamo et al. | 148/3 |
| 4,153,484 | 5/1979 | Gamo et al. | 423/644 |
| 4,160,014 | 7/1979 | Gamo et al. | 423/644 |
| 4,195,989 | 4/1980 | Gamo et al. | 423/644 |
| 4,228,145 | 10/1980 | Gamo et al. | 423/644 |
| 4,512,965 | 4/1985 | Wallace et al. | 420/900 |
| 4,567,032 | 1/1986 | Wallace et al. | 420/581 |
| 4,898,794 | 1/1990 | Doi et al. | 420/581 |
| 4,946,646 | 8/1990 | Gamo et al. | 420/900 |
| 5,006,328 | 4/1991 | Hong | 429/101 |
| 5,028,389 | 7/1991 | Lee et al. | 420/900 |

OTHER PUBLICATIONS

Gamo, et al., Laves phase Alloys as Hydrogen-Storage Electrodes for Nickel/Hydrogen Batteries, Denki Kagaku 57 (1989) 488.

Gamo, et al., Life Properties of Ti-Mn Alloy Hydrides and their Hydrogen Purification Effect, J. Less Common Metals, 89 (1983) 495.

Gamo, et al, Formation and Properties of Titanium-Manganese Alloy Hydride, Int. J Hydrogen Energy 10 (1985) 39.

Moriwaki, et al, Leaves Phase Alloys as Hydrogen Storage Electrodes for Nickel/Hydrogen Batteries, Pro. 29th Battery Symp. in Japan, 1988 p. 117.

Gamo, et al, Laves Phase Alloy Hydride Electrode for NI-H2 Rechargeable Battery, International Symposium on Metal-Hydrogen Systems (Fundamentals and Applications) Alberta, Canada.

Primary Examiner—George Wyszomierski
Attorney, Agent, or Firm—Stevens, Davis, Miller & Mosher

[57] ABSTRACT

In the method of the present invention for producing a hydrogen-storing alloy, part or whole of single substance of Zr as a starting material is replaced with a ferrozirconium or a zircalloy. This method enables production of a hydrogen-storing alloy at reduced material and production costs and with high efficiency and safety of work. The alloy produced by this method has high homogeneity with no segregation. It is thus possible to obtain a hydrogen-storing alloy superior in hydrogen-storing characteristics such as hydrogen storage capacity, reaction speed, and electrode reaction efficiency in an electrolyte. It is also possible to obtain, by using this alloy, a nickel-hydrogen storage battery having a large storage capacity and capable of performing quick charging and discharging, while exhibiting longer life and higher economy.

6 Claims, 2 Drawing Sheets

METHOD OF PRODUCING HYDROGEN-STORING ALLOY AND ELECTRODE MAKING USE OF THE ALLOY

This application is a continuation of application Ser. No. 07/548,891, filed Aug. 2, 1990.

TECHNICAL FIELD

The present invention relates to a method of producing a hydrogen-storing alloy which is capable of reversibly storing and releasing large quantity of hydrogen, and also to a storage battery electrode making use of the alloy.

BACKGROUND ART

Hitherto, hydrogen-storing alloys of the kinds containing rare earth elements or Zr(Ti) or Mg have been known as materials used for storage, holding and transportation of hydrogen, heat pumps, alkali storage batteries, and so forth. Among these alloys, alloys of Zr(Ti)-Ni, Zr(Ti)-Fe, Zr(Ti)-V and Zr(Ti)-Sn, as well as alloys containing many elements which are based on these alloys with part of elements replaced with other element or with addition of another element, are attracting attention because these alloys are superior in hydrogen storage capacity, reaction speed, hydrogen-dissociating equilibrium pressure, safety in terms of flammability in air, and electrochemical hydrogen storage and release characteristics. More specifically, Zr-containing Lavas-phase alloys ($AB_2$ type alloy: A and B representing different elements) are suitable for practical use because they can safely store and release large quantity of hydrogen.

In general, this type of hydrogen-storing alloy is produced by a process which utilizes single substance of Zr or V as the starting material. More specifically, the single substance of the metal as one of the starting material is placed at a predetermined atomic ratio in an aluminum crucible or a water-cooled copper crucible and is directly melted to synthesize the hydrogen-storing alloy in the crucible by placing the crucible in a high-frequency induction heating surface, high-temperature resistance heating oven or an arc melting surface.

When single substance of Zr or V is molten as one of the starting materials, the alloy composition tends to deviate from the expected composition due to such reason that such substance in molten state reacts with the metal of the crucible or due to difference in vapor pressure of such substance from those of other elements at high temperature. It is therefore difficult to obtain homogeneous excellent alloy having the aimed composition. In addition, production of single substance of Zr or V requires a complicated refining process so that the prices of such substances are relatively high. Furthermore, handling of such substances has to be conducted with care to ensure safety, because these single substances generate toxic vapors. Thus, from the view points of practicality, economy and safety, it has been desired that no single substance of Zr or V is used in the production of Zr- or V-type alloys.

Hydrogen-storing alloys produced by processes which do not rely upon single substance of Zr or V are practical in view of both characteristics and cost and, hence, are expected to be promising as materials of electrodes of nickel-hydrogen storage batteries.

DISCLOSURE OF THE INVENTION

An object of the present invention is to provide a hydrogen-storing alloy which can be produced at low cost with high degrees of reliability and reproducibility and which exhibits superior hydrogenation characteristic, as well as a storage battery electrode making use of the alloy, thereby overcoming the above-described problems encountered with the production of Zr- or V-containing hydrogen storing alloy.

The production method according to the present invention makes use of commercially available ferrozirconium (Zr-Fe) alloy and zircalloy (Zr-Sn alloy) in place of single substance of Zr and ferrovanadium in place of single substance of vanadium, whereby a hydrogen-storing alloy can be produced with reduced material and production costs, high efficiency, reliability and safety in the production. The thus produced hydrogen-storing alloy is homogeneous without segregation and, therefore, is excellent in properties such as hydrogen storage capacity, reaction speed, electrochemical hydrogen storage/release characteristics in an electrolyte, electrode reaction efficiency, and so forth.

When ferrozirconium, zircalloy and ferrovanadium cannot provide exactly an aimed alloy composition, the present invention does not exclude the use of single substance of the metals so as to adjust the composition thereby enabling production of an alloy exactly having the sought after composition, thus attaining an equivalent effect. The method of the invention provides a stable quality of the product without substantial fluctuation between lots, as well as high degree of homogeneity of the product alloy, while ensuring high reproducibility of storage and discharge of hydrogen, as well as reliability. Furthermore, the costs are reduced and occurrence of toxic vapors is prevented. It is also to be pointed out that the product alloy exhibits superior anti-oxidation characteristics.

The present invention is effective when applied to the production of a hydrogen-storing alloy, in particular to an alloy expressed by a general formula $AB\alpha$ [where, A represents a component selected from the group consisting of: a single substance of Zr; a single substance of Ti; and Zr and at least one component selected from the group consisting of Ti, Hf, Ta, Y, Ca, Mg, La, Ce, Pr, Mm, Nb, Nd, Mo, Al and Si. B represents component selected from the group consisting of: a single substance of Fe; Fe, V and at least a component selected from the group consisting of Ni, Cr, Mn, Co, Cu, Zn, Al, Si, Nb, Mo, W, Mg, Ca, Y, Ta, Pd, Ag, Au, Cd, In, Sn, Bi, La, Ce, Pr, Nd, Th, Sm and Mm (Mm represents a mixture of rare earth elements); and Fe and at least one component selected from the group consisting of Ni, Cr, Mn, Co, Cu, Zn, Al, Si, Nb, Mo, W, Mg, Ca, Y, Ta, Pd, Ag, Au, Cd, In, Sn, Bi, La, Ce, Pr, Nd, Th, Sm and Mm. $\alpha$ represents a value of from 1.5 to 2.5. A and B are elements different each other or of different compositions. Alternatively, B represents one a component selected from the group consisting of: a single substance of Sn; and Sn and at least one selected from the group consisting of V, Ni, Cr, Mn, Co, Cu, Zn, Al, Si, Nb, Mo, W, Mg, Ca, Y, Ta, Pd, Ag, Au, Cd, In, Bi, La, Ce, Pr, Nd, Th, Sm and Mm (Mm represents a mixture of rare earth elements); $\alpha$ being a value of from 1.5 to 2.5; A and B being different elements each other or of different compositions], wherein the alloy phase substantially belongs to Lavas phase of intermetallic compound with a crystalline structure of hexagon-symmetrical C14 type having crystalline lattice constants of a = 4.8 to 5.2 and c = 7.9 to 8.3 and/or cubic-symmetrical C15 type having crystalline lattice constant of a = 6.92 to 7.70.

The advantage of the invention is remarkable particularly also when the alloy produced by the above-described method is used as the material of a hydrogen-storing electrode of a Ni-hydrogen storage battery.

THE BEST MODE FOR CARRYING OUT THE INVENTION

Figure 1:
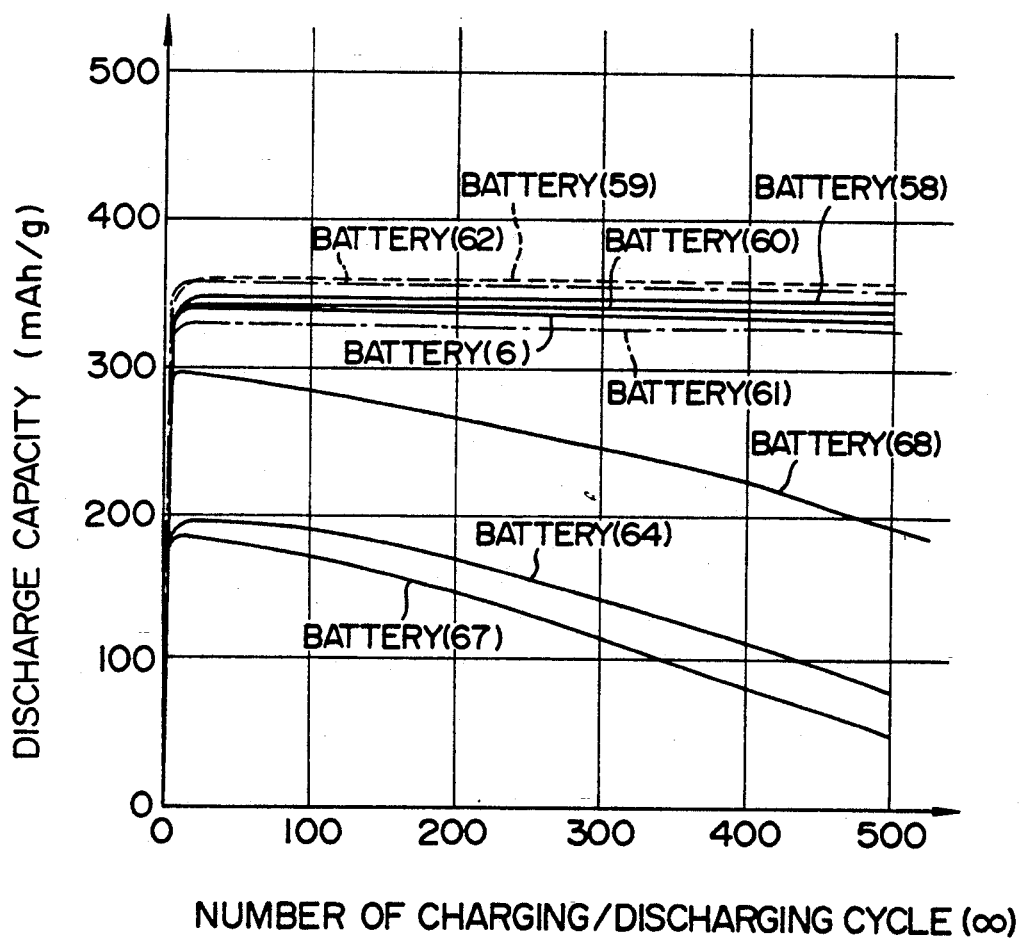
FIG. 1 is a diagram showing discharge cycle life characteristic of half cells having hydrogen-storing electrodes as an embodiment of the present invention.

In the drawings showing examples of the invention, the number (No.) of batteries represents that the alloy of the corresponding No. in Tables in the specification is used as the electrode material.

EXAMPLE 1

Table 1 shows compositions and price ratio of elemental of zirconium (Zr) and ferrozirconium alloys which are used as starting materials in the method of the present invention. As will be seen from Table 1, elemental zirconium metal has a price per unit weight which is about 2 to 7 times as high that of ferrozirconiums. For instance, the ferrozirconium 1 shown in Table 1 is about 1/5 in price as compared with pure Zr and has a Zr content of as high as 80%.

TABLE 1

|  | Zr (%, Min.) | Fe (%, Max.) | Mn (%, Max.) | C (%, Max.) | Price ratio to unit weight of Zr |
|---|---|---|---|---|---|
| Zirconium 1 (sponge) | 99.8 | 0.03 | 0.005 | 0.01 | 1 |
| Zirconium 2 (sponge) | 99.5 | 0.1 | 0.01 | 0.03 | 0.61 |
| Zirconium 3 (sponge) | 99.0 | 0.5 | 0.03 | 0.05 | 0.52 |
| Ferro-zirconium 1 | 80.0 | 19.5 | 0.2 | 0.1 | 0.22 |
| Ferro-zirconium 2 | 50.0 | 49.2 | 0.3 | 0.1 | 0.15 |

Examination by an SEM and a TEM showed that both the ferrozirconiums 1 and 2 have high degree of homogeneity. It was also found that the vapor pressure of these ferrozirconiums in a molten state is about ½ or less that of single substance of Zr, suggesting that deviation of the product composition can be made smaller.

In a conventional method for producing an alloy containing Zr and Fe, in particular alloy of ABα type alloy of Laves phase, materials such as electrolytic iron, mond nickel and so forth are added to the expensive zirconium at predetermined rations and the mixture thus obtained were directly melted to form the alloy. Thus, the conventional process is costly and requires a complicated production process, while posing problems such as easy oxidation of single substance of zirconium and lack of uniformity of the product alloy structure. These problems, however, can be overcome by the use of ferrozirconiums of the type shown in Table 1.

The production method of the invention which makes use of a ferrozirconium can be carried out by the same procedure as that of a known melting process which employs a high-frequency melting furnace or an arc furnace. Zr(Ti)-Fe type alloys of Nos. 1 to 5 shown in Table 2 were obtained by using alloys 1 and 2 of Table 1 for their Zr content and adding thereto residual amounts of other constituents at desired composition ratios and melting the composition to form hydrogen storage alloys. Each of these alloys exhibited higher degree of homogeneity than prior art alloys, without causing any segregation. In addition, there was no substantial deviation of composition from aimed composition. Fluctuation between lots also was confirmed to be small. Hydrogen storing characteristics such as hydrogen storage capacity, reaction speed and flammability in the air were examined and shown in the same Table. It will be seen that these alloys showed large values of hydrogen storage capacities and excellent properties such as reaction speed.

EXAMPLE 2

Alloys of compositions of Nos. 6 to 11 shown in Table 2 were prepared through the same process as Example 1 by selecting, among ABα type alloys, alloys expressed by a general formula of $Zr\alpha Ni\gamma M\delta$, [where $\alpha$, $\gamma$ and $\delta$ represent atomic rations of Zr, Ni and M satisfying the conditions of $\alpha = 0.5$ to 1.5, $\gamma = 0.4$ to 2.5 and $\delta = 0.01$ to 1.8, $\gamma + \delta = 1.2$ to 3.7, while M represents one selected from the group consisting of: a single substance of Fe; and Fe and at least one selected from the group consisting of V, Mg, Ca, Y, Hf, Nb, Ta, Cr, Mo, W, Mn, Co, Pd, Cu, Ag, Au, Zn, Cd, Al, Si, In, Sn, Bi, La, Ce, Mm, Pr, Nd, Th and Sm], which $Zr\alpha Ni\gamma M\delta$ alloys were produced by using, as the starting materials, commercially available ferrozirconiums and other elements selected from the group consisting of Zr, Ni, Ti, Hf, Ta, Y, Ca, Mg, La, Ce, Nd, Sm, Mo, Al, Si, V, Cr, Mn, Fe, Co, Cu, Zn, Si, Nb, Mo, W and Cd and mixtures of rare earth elements.

TABLE 2

| Alloy No. | Alloy Composition | Hydrogen-Storage Capacity (ml/g) |
|---|---|---|
| 1 | $ZrFe$ | 186 |
| 2 | $ZrFe_{1.25}V_{0.3}$ | 245 |
| 3 | $Zr_{1.2}Fe_{0.2}Mn_{0.4}A_{10.1}$ | 211 |
| 4 | $Zr_{0.6}Ti_{0.4}Fe_{0.6}V_{0.8}$ | 238 |
| 5 | $ZrCo_{1.0}Fe_{0.3}Mn_{0.3}$ | 268 |
| 6 | $ZrV_{0.2}Ni_{1.4}Fe_{0.4}$ | 2-2 |
| 7 | $ZrV_{0.3}Ni_{1.3}Fe_{0.2}$ | 218 |
| 8 | $Zr_{1.1}Hf_{0.1}V_{0.6}Ni_{1.2}Fe_{0.2}$ | 207 |
| 9 | $Zr_{0.6}V_{0.7}Ni_{1.2}Fe_{0.7}Mm_{0.2}$ | 205 |
| 10 | $ZrV_{0.4}Ni_{1.8}Fe_{0.3}Mn_{0.3}$ | 219 |
| 11 | $ZrV_{0.2}Ni_{1.3}Ce_{0.1}Co_{0.1}Fe_{0.2}$ | 200 |
| 12 | $ZrV_{0.2}Ni_{1.4}Fe_{0.4}$ | 154 |
| 13 | $Ti_{0.3}Zr_{0.7}V_{0.4}Ni_{1.0}Fe_{0.4}$ | 149 |
| 14 | $Zr_{0.4}V_{0.3}Ni_{1.0}Fe_{0.5}$ | 98 |
| 15 | $ZrV_{0.5}Ni_{1.3}Fe_{1.9}$ | 112 |

More specifically, the ferrozirconium and other materials were weighed and mixed to provide mixtures having the particular constituent ratios shown in Table 2 and the mixtures were directly melted in an argon-arc melting furnace (or by a high-frequency induction heating furnace maintaining argon or other inert gas atmosphere) to thereby produce hydrogen-storing alloys Nos 6 to 11 shown to Table 2. Part of each of alloys thus obtained was used for alloy analysis for examining atomic composition, crystalline structure, crystalline lattice constants and homogeneity, while the remainder was used for measurement of hydrogen storage/release characteristics conducted in hydrogen gas [mainly with respect to the measurement of P (pressure), C (composition) and T (temperature)] as well as for evaluation of electrochemical performance.

As results of the analysis, it was confirmed that each of the alloys Nos. 6 to 11 had homogeneous structure with alloy phases of C14 or C15 type Laves phase. The crystalline lattice constants thereof were a $=4.8$ to 5.2 and c$=7.9$ to 8.3 in a case of type C14 which was hexagonal symmetric phase and other crystalline lattice constants were a $=6.92$ to 7.70 in a case of the type C15 which was cubic symmetrical phase. It was confirmed also that there was no substantial deviation of composition. Hydrogen storage capacities of these alloys were measured from ordinary P-C-T characteristics to obtain the results shown in Table 2. It will be seen that the storage capacities are greater than those of prior art alloys. Other characteristics such as reaction speed also were found to be excellent.

Alloys produced by conventional production methods are also shown as Nos. 12 to 15 for the purpose of comparison. These alloys showed inferior homogeneity and deviation of composition, and considerably smaller values of hydrogen storage capacity though these comparison alloys were of similar type to that of the alloys produced by the method of the invention.

Many alloy compositions are obtainable by the production method of the invention in addition to those shown in Table 2. Hydrogen-storing electrodes were produced with those obtainable alloys but specifically remarkable effect was attained with the alloys having alloy phases substantially belongs to Lavas phase of intermetallic compound with a crystalline structure of hexagon-symmetrical C14 type having crystalline lattice constants of a$=4.8$ to 2.5 and c$=7.9$ to 8.3 and/or cubic-symmetrical C15 type having crystalline lattice constant of a$=6.92$ to 7.70.

Thus, the method of the invention for producing a hydrogen-storing alloy from a ferrozirconium containing Fe and Zr as the starting material was confirmed to be simpler than known methods and to be able to provide remarkably higher degree of homogeneity, as well as superior hydrogen storage, holding and transportation characteristics, as compared with alloys produced by conventional method which employed single substances of Fe and Zr as the starting materials.

The present inventors compared and evaluated the alloys produced by the method of the invention from the viewpoint of hydrogen storage/release capacity, in order to find the optimum composition.

As a result, the inventors have found that the best results are obtained when the alloy composition falls within a range which is expressed by a general formula of $Zr\alpha Ni\gamma M\delta$, [where $\alpha$, $\gamma$ and $\delta$ represent atomic ratios of Zr, Ni and M, satisfying the conditions of $\alpha=0.5$ to 1.5, $\gamma=0.4$ to 2.5 and $\delta=0.01$ to 1.8, $\gamma+\delta=1.2$ to 3.7, while M represents one selected from the group consisting of: a single substance of Fe; and fe and at least one selected from the group consisting of V, Mg, Ca, Y, Hf, Nb, Ta, Cr, Mo, W, Mn, Co, Pd, Cu, Ag, Au, Zn, Cd, Al, Si, In, Sn, Bi, La, Ce, Mm, Pr, Nd, Th and Sm].

Alloys having the atomic ratio $\delta$ smaller than 0.01 or greater than 1.8 equally showed somewhat small values of hydrogen release amounts. Alloys having atomic ratio $\alpha$ smaller than 0.5 showed somewhat inferior hydrogen storage capacity, while Alloys having atomic ratio $\alpha$ greater than 1.5 showed comparatively small value of hydrogen release amount. Alloys having atomic ratio $\gamma$ smaller than 0.4 showed inferior durability against repetition of hydrogen storage/release cycles, while alloys having atomic ratio $\gamma$ greater than 2.5 showed somewhat small value of hydrogen storage capacity. Alloys with values $(\gamma+\delta)$ smaller than 1.2 and greater than 23.7 respectively showed rather inferior hydrogen release amounts and rather inferior hydrogen storage capacities. The reasons of these facts are shown below. The Zr content $\alpha$ is a factor which affects particularly the hydrogen storage capacity. The greater the Zr content, the greater the hydrogen storage capacity. Zr, however, forms a stable hydrogen compound and, therefore, exhibits a smaller hydrogen release rate and, hence, smaller hydrogen release amount. The Ni content is a factor which affects particularly the storage/release cycle (durability). The greater the Ni content, the longer the life. A too large Ni content, however, tends to reduce hydrogen release capacity. The content $\delta$ of M relates specifically to the storage/release cycle and the discharge pressure. Both the storage/release cycle and the release pressure were improved by an increase in the M content, but the hydrogen storage capacity was reduced as a result of the increase in the M content. It was also confirmed that the use of Fe as an essential element provides higher meltability and homogeneity of alloys, as well as industrial and economical advantages due to its low price.

Hydrogen-storing negative electrodes of alkali storage battery were produced by the alloys of the invention. The alloys having a composition expressed by the above-mentioned general formula of $Zr\alpha Ni\gamma M\delta$ showed specifically large electric storage capacity values, as shown in Table 3.

TABLE 3

| Alloy No. | Alloy Composition | Amount of discharge after 10 cycles (mAh/g) |
|---|---|---|
| 16 | $ZrNi_{1.4}Fe_{0.6}$ | 346 |
| 17 | $ZrNi_{1.3}Fe_{0.25}V_{0.3}$ | 345 |
| 18 | $Zr_{1.2}Ni_{1.2}Fe_{0.2}Mn_{0.5}$ | 341 |
| 19 | $Zr_{0.6}Ni_{1.2}Fe_{0.6}V_{0.8}$ | 338 |
| 20 | $ZrNi_{1.0}Fe_{0.3}Mn_{0.3}$ | 368 |
| 21 | $ZrNi_{1.3}Ce_{0.1}Co_{0.1}Fe_{0.2}$ | 338 |

EXAMPLE 3

Table 4 shows compositions and price ratio of a single substance of zirconium (Zr) and zircalloys which are used as starting materials in the method of the present invention. As will be seen from Table 4, single substance of zirconium metal has a price per unit weight which is about 3 to 8 times as high that of zircalloys. For instance, the zircalloy 1 shown in Table 1 is about 1/7 in price as compared with pure Zr and yet the Zr content is as high as 98%.

TABLE 4

| | Zr (%, Min.) | Sn (%, Max.) | Fe (%, Max.) | Cr (%, Max.) | Price ratio to unit weight of Zr |
|---|---|---|---|---|---|
| Zirconium 1 (sponge) | 99.8 | 0.005 | 0.03 | 0.05 | 1 |
| Zirconium 2 (sponge) | 99.5 | 0.01 | 0.1 | 0.07 | 0.61 |
| Zirconium 3 (sponge) | 99.0 | 0.04 | 0.5 | 0.17 | 0.52 |

TABLE 4-continued

|  | Zr (%, Min.) | Sn (%, Max.) | Fe (%, Max.) | Cr (%, Max.) | Price ratio to unit weight of Zr |
|---|---|---|---|---|---|
| Zircalloy 1 1 (bulk) | 98.1 | 1.4 | 0.1 | 0.1 | 0.15 |
| Zircalloy 2 2 (bulk) | 90.0 | 5.2 | 1.4 | 1.2 | 0.12 |

Further, the examination thereof showed that both the zircalloys 1 and 2 have high degree of homogeneity. It was also found that the vapor pressure of these zircalloys when molten is lower than that of single substance of Zr, suggesting that deviation of the product composition can be made smaller.

In the conventional method for producing an alloy containing Zr and Sn, in particular alloys of AB$\alpha$ type alloy of Laves phase, materials such as electrolytic iron, mond nickel, single substance of Sn and so forth are added to the expensive zirconium at a predetermined ratio and the mixture thus obtained were directly melted to form the alloy. Thus, the conventional process is high in cost and requires a complicated production process, while posing problems such as easy oxidation of single substance of zirconium and lack of uniformity of the product alloy structure. These problems, however, can be overcome by the use of zircalloys of the type shown in Table 4.

The production method of the invention which makes use of a zircalloy can be carried out by the same procedure as that of a known melting process which employs a high-frequency melting furnace or an arc furnace. Zr(Ti)-M type alloys (M being Sn and at least one selected from the group consisting of Fe, V, Mg, Ca, Y, Hf, Nb, Ta, Cr, Mo, W, Mn, Co, Pd, Cu, Ag, Au, Zn, Cd, Al, Si, In, Bi, La, Ce, Mm, Pr, Nd, Th and Sm) of Nos. 22 to 26 shown in Table 5 were dispensed at desired composition ratios and melted to form alloys. Each of these alloys exhibited higher degree of homogeneity than prior art alloys, without suffering any segregation. In addition, there was no substantial deviation of composition from aimed composition. Fluctuation between lots also as confirmed to be small. Hydrogen storing characteristics such as hydrogen storage capacity, reaction speed and flammability in the air were examined and shown in the same Table. It will be seen that these alloys showed large values of hydrogen storage capacity and excellent properties such as reaction speed.

EXAMPLE 4

Alloys of compositions of Nos. 27 to 32 shown in Table 5 were prepared by the same process as example 3, selecting, among AB$\alpha$ type alloys, alloys expressed by a general formula of Zr$\alpha$Ni$\gamma$M$\delta$, [where $\alpha$, $\gamma$ and $\delta$ represent atomic rations of Zr, Ni and M, satisfying the conditions of $\alpha=0.5$ to 1.5, $\gamma=0.4$ to 2.5 and $\delta=0.01$ to 1.8, $\gamma+\delta=1.2$ to 3.7, while M represents one selected from the group consisting of: a single substance of Sn; and Sn and at least one selected from the group consisting of Fe, V, Mg, Ca, Y, Hf, Nb, Ta, cr, Mo, W, Mn, Co, Pd, Cu, Ag, Au, Zn, Cd, Al, Si, In, Bi, La, Ce, Mm, Pr, Nd, Th and Sm], using as the starting materials, commercially available zircalloys and other elements such as Zr, Ni, Ti, Hf, Ta, Y, Ca, Mg, La, Ce, Mm, Nb, Nd, Sm, Mo, Al, Si, V, Cr, Mn, Fe, Co, Cu, Zn, Si, Nb, Mo, W and Cd.

TABLE 5

| Alloy No. | Alloy Composition | Hydrogen-Storage Capacity (ml/g) |
|---|---|---|
| 22 | ZrSn$_{0.05}$ | 384 |
| 23 | ZrSn$_{0.25}$V$_{1.3}$ | 345 |
| 24 | Zr$_{1.2}$Sn$_{0.2}$Mn$_{0.4}$Al$_{0.1}$ | 351 |
| 25 | Zr$_{0.6}$Ti$_{0.6}$Sn$_{0.6}$V$_{00.8}$ | 337 |
| 26 | ZrSn$_{0.3}$Co$_{1.0}$Fe$_{0.3}$ | 328 |
| 27 | ZrSn$_{0.3}$V$_{0.2}$Ni$_{1.4}$ | 252 |
| 28 | ZrSn$_{0.1}$V$_{0.3}$Ni$_{1.3}$Fe$_{0.2}$ | 226 |
| 29 | Zr$_{1.1}$Hf$_{0.1}$Sn$_{0.2}$V$_{0.6}$Ni$_{1.2}$ | 241 |
| 30 | Zr$_{0.6}$Ti$_{0.3}$Sn$_{0.3}$Ni$_{1.5}$Mm$_{0.2}$ | 219 |
| 31 | ZrSn$_{0.1}$V$_{0.4}$Ni$_{1.2}$Mn$_{0.3}$ | 204 |
| 32 | ZrSn$_{0.2}$Ni$_{1.3}$Ce$_{0.1}$Co$_{0.4}$ | 223 |
| 33 | ZrSn$_{0.1}$V$_{0.3}$Ni$_{1.5}$ | 162 |
| 34 | Zr$_{0.7}$Ti$_{0.3}$Sn$_{0.3}$V$_{0.7}$Ni$_{1.0}$ | 150 |
| 35 | ZrSn$_{0.2}$V$_{0.3}$Ni$_{1.2}$Fe$_{0.2}$ | 135 |
| 36 | ZrSn$_{0.5}$Ni$_{1.3}$Fe$_{1.9}$ | 122 |

More specifically, zircalloys and other materials were weighed and mixed to provide the compositions shown in Table 5 and were directly melted in an argon-arc melting furnace (or by a high-frequency induction heating furnace maintaining argon or other inert gas atmosphere). Analysis and evaluation methods are the same as that explained in connection with ferrozirconium.

As results of the analysis, it was confirmed that each of the alloys Nos. 27 to 32 shown in Table 5 had homogeneous structure with alloy phases of C14 or C15 type Laves phase. The crystalline lattice constants were $a=4.8$ to 5.2 and $c=7.9$ to 8.3 in a case of type C14 which was hexagonal symmetric phase and the crystalline lattice constant were $a=6.92$ to 7.70 in another case of the type C15 which was cubic symmetrical phase. It was confirmed also that there was no substantial deviation of composition. Hydrogen storage capacities of these alloys were measured from ordinary P-C-T characteristics to obtain the results shown in Table 5. It will be seen that the storage capacities are greater than those of known alloys. Other characteristics such as reaction speed also were found to be excellent.

Alloys produced by conventional production methods are also shown in Table 5 as Nos. 33 to 36 for the purpose of comparison. These alloys showed inferior homogeneity and deviation of composition, and considerably smaller values of hydrogen storage capacity though these comparison alloys were of similar type to that of the alloys produced by the method of the invention.

Many alloy compositions are obtainable by the production method of the invention in addition to those shown in Table 5. Hydrogen-storing electrodes were produced with those obtainable alloys but specifically remarkable effect was attained with alloys having a composition expressed by a general formula AB$\alpha$ [where, A represents at least one selected from the group consisting of Zr, Ti, Hf, Ta, Y, Ca, Mg, La, Ce, Pr, Mm, Nb, Nd, Mo, Al and Si and B represents one kind selected from the group consisting of: a single substance of Sn; and Sn and at least one selected from the group consisting of Fe, V, Ni, Cr, Mn, Co, Cu, Zn, Al, Si, Nb, Mo, W, Mg, Ca, Y, Ta, Pd, Ag, Au, Cd, In, Bi, La, Ce, Pr, Nd, Th, Sm and Mm (Mm represents a mixture of rare earth elements); $\alpha$ represents a value of 1.5 to 2.5, and A and B are different elements], wherein the alloy phase substantially belongs to Lavas phase of intermetallic compound with a crystalline structure of hexagon-symmetrical C14 type with crystalline lattice constants of $a=4.8$ to 5.2 and $c=7.9$ to 8.3 and/or cubic-symmetrical C15 type with crystalline lattice constant of a=6.92 to 7.70. Further, regarding the cubic-symmetrical C15 type, alloys having crystalline lattice constant of 6.92 to 7.70 particularly exhibited excellent characteristics.

Thus, the method of the invention for producing a hydrogen-storing alloy from a zircalloy containing Zr and Sn as the starting material was confirmed to be simpler than known methods and to be able to provide much higher degree of homogeneity, as well as hydrogen storage, holding and transportation characteristics, as compared with alloys produced by conventional method which employed single substances of Fe and Zr as the starting materials.

The present inventors compared and evaluated the alloys produced by the method of the invention from the viewpoint of hydrogen storage/release capacity, in order to find the optimum composition, as in the case of the ferrozirconium alloy (Zr-Fe alloy) explained before.

As a result, the inventors have found that the best results are obtained when the alloy composition falls within a range which is expressed by a general formula or $Zr\alpha Ni\gamma M\delta$, [where $\alpha$, $\gamma$ and $\delta$ represent atomic ratios of Zr, Ni and M, satisfying the conditions of $\alpha=0.5$ to 1.5, $\gamma=0.4$ to 2.5 and $\delta=0.01$ to 1.8, $\gamma+\delta=1.2$ to 3.7, while M represents one selected from the group consisting of: a single substance of Sn; and Sn and at least one selected from the group consisting of Fe, V, Mg, Ca, Y, Hf, Nb, Ta, Cr, Mo, W, Mn, Co, Pd, Cu, Ag, Au, Zn, Cd, Al, Si, In, Bi, La, Ce, Mm, Pr, Nd, Th and Sm].

Alloys having the atomic ratio $\delta$ smaller than 0.01 or greater than 1.8 showed somewhat small values of hydrogen release amounts. Alloys having atomic ratio $\alpha$ smaller than 0.5 showed somewhat inferior hydrogen storage capacity, while Alloys having atomic ratio $\alpha$ greater than 1.5 showed comparatively small value of hydrogen release amount. Alloys having atomic ratio $\gamma$ smaller than 0.4 showed inferior durability against repetition of hydrogen storage/release cycles, while alloys having atomic ratio $\gamma$ greater than 2.5 showed somewhat small value of hydrogen storage capacity. Alloys with values ($\gamma+\delta$) smaller than 1.2 and greater than 3.7 respectively showed rather inferior hydrogen release amounts and rather inferior hydrogen storage capacities. The reasons of these facts are shown below. The Zr content $\alpha$ is a factor which affects particularly the hydrogen storage capacity. The greater the Zr content, the greater the hydrogen storage capacity. Zr, however, forms a stable hydrogen compound and, therefore, exhibits a smaller hydrogen release rate and, hence, smaller hydrogen release amount. The Ni content is a factor which affects particularly the storage/release cycle (durability). The greater the Ni content, the longer the life. A too large Ni content, however, tends to reduce hydrogen storage capacity. The content $\delta$ of M relates specifically to the storage/release cycle and the discharge pressure. Both the storage/release cycle and the release pressure were improved by an increase in the M content, but the hydrogen storage capacity was reduced as a result of the increase in the M content. It was also confirmed that the use of Sn as an essential element provides higher meltability and homogeneity of alloys, as well as industrial and economical advantages due to its low price.

Hydrogen-storing negative electrodes of alkali storage battery were produced by the alloys of the invention. The alloys having a composition expressed by the above-mentioned general formula of $Zr\alpha Ni\gamma M\delta$ showed specifically large electric storage capacity values.

TABLE 6

| Alloy No. | Alloy Composition | Amount of Discharge after 10 cycles (mAh/g) |
|---|---|---|
| 37 | $ZrSn_{0.4}Ni_{1.6}$ | 334 |
| 38 | $ZrSn_{0.25}Ni_{1.3}V_{0.3}$ | 328 |
| 39 | $Zr_{1.2}Sn_{0.2}Ni_{1.2}Mn_{0.5}$ | 343 |
| 40 | $Zr_{0.9}Sn_{0.1}Ni_{1.2}Fe_{0.3}V_{0.8}$ | 326 |
| 41 | $ZrSn_{0.3}Ni_{1.2}Cr_{0.3}$ | 337 |
| 42 | $ZrSn_{0.2}Ni_{1.3}Ce_{0.1}Co_{0.1}$ | 312 |

EXAMPLE 5

Table 7 shows compositions and price ratio of a single substance of vanadium (V) and ferrovanadium alloys which were used as starting materials in the method of the present invention. As will be seen from Table 1, single substance of vanadium metal has a price per unit weight which is about 3 to 4 times as high that of ferrovanadium. For instance, the ferrovanadium 1 shown in Table 7 is about ⅓ in price as compared with pure vanadium and yet the vanadium content is as high as 70%.

TABLE 7

| | V (%, min.) | Fe (%, Max.) | Mn (%, Max.) | C (%, Max.) | Price ratio to unit weight of V |
|---|---|---|---|---|---|
| Vanadium 1 (Flake) | 99.8 | 0.03 | 0.002 | 0.01 | 1 |
| Vanadium 2 (Flake) | 99.5 | 0.1 | 0.01 | 0.03 | 0.71 |
| Vanadium 3 (Flake) | 99.0 | 0.5 | 0.03 | 0.05 | 0.62 |
| Ferro-vanadium 1 | 70.00 | 29.3 | 0.2 | 0.1 | 0.32 |
| Ferro-vanadium 2 | 40.0 | 59.2 | 0.3 | 0.1 | 0.25 |

Examination showed that both the ferrovanadiums 1 and 2 have high degree of homogeneity. It was also found that the vapor pressure of these ferrovanadium when melted is about ½ or less that of single substance of V, suggesting that deviation of the product composition can be made smaller.

In the conventional method for producing an alloy containing V and Fe, in particular alloy of AB$\alpha$ type alloy of Lavas phase, materials such as electrolytic iron, mond nickel and so forth are added to the expensive vanadium at predetermined ratio and the mixture thus obtained were directly melted to form the alloy. Thus, the conventional process is costly and requires a complicated production process, while posing problems such as toxicity of single substance of V and lack of uniformity of the product alloy structure. These problems, however, can be overcome by the use of ferrovanadiums of the type shown in table 7.

The production method of the invention which makes use of a ferrovanadium can be carried out by the same procedure as that of a known melting process which employs a high-=frequency melting furnace of an arc furnace. Ti(Zr)-Ni type alloys, Fe-V type alloys and Ti(Zr)-V type alloys of Nos. 43 to 47 shown in Table 8 were dispensed at desired composition ratios and melted to form alloys. Each of these alloys exhibited higher degree of homogeneity than prior art alloys, without suffering any segregation. In addition, there was no substantial deviation of composition from aimed composition. Fluctuation between lots also was confirmed to be small. Hydrogen storing characteristics such as hydrogen storage capacity, reaction speed and flammability in the air were examined and shown in the same Table. it will be seen that these alloys showed large values of hydrogen storage capacities and excellent properties such as reaction speed.

EXAMPLE 6

Alloys of compositions of Nos. 48 top 53 shown in Table 8 were prepared by the same process as Example 1, selecting, among AB$\alpha$ type alloys, alloys expressed by a general formula of Zr$\alpha$V$\beta$Ni$\gamma$M$\delta$, [where $\alpha$, $\beta$, $\gamma$ and $\delta$ represent atomic ratios of Zr, V, Ni and M satisfying the conditions of $\alpha=0.5$ to 1.5, $\beta=0.01$ to 1.2, $\gamma=0.4$ to 2.5 and $\delta=0.01$ to 1.8, $\beta+\gamma+\delta=1.2$ to 3.7, while m represents one selected from the group consisting of: a single substance of Fe; and Fe and at least one selected from the group consisting of Mg, Ca, Y, Hf, Nb, Ta, Cr, Mo, W, Mn, Co, Pd, Cu, Ag, Au, Zn, Cd, Al, Si, In, Sn, Bi, La, Ce, Mm, Pr, Nd, Th and Sm], using, as the starting materials, commercially available ferrovanadiums and other elements such as Zr, Ni, Ti, Hf, Ta, Y, Ca, Mg, La, Ce, Mm, Nb, Nd, Sm, Mo, Al, Si, V, Cr, Mn, Fe, Co, Cu, Zn, Si, Nb, Mo, W and Cd.

TABLE 8

| Alloy No. | Alloy Composition | Amount of discharge after 10 cycles (mAh/g) |
|---|---|---|
| 43 | FeV | 177 |
| 44 | TiFe$_{1.2}$V$_{0.8}$ | 181 |
| 45 | ZrV$_{1.5}$Fe$_{0.5}$ | 243 |
| 46 | Ti$_{0.5}$Zr$_{0.5}$V$_{1.2}$Fe$_{0.8}$ | 218 |
| 47 | FeV$_{1.0}$Mn$_{0.5}$Co$_{0.5}$ | 162 |
| 48 | ZrV$_{0.2}$Ni$_{1.4}$Fe$_{0.4}$ | 202 |
| 49 | ZrV$_{0.3}$Ni$_{1.3}$Fe$_{0.2}$ | 218 |
| 50 | Zr$_{1.2}$V$_{0.6}$Ni$_{1.2}$Fe$_{0.2}$ | 207 |
| 51 | Zr$_{0.6}$V$_{0.9}$Ni$_{1.2}$Fe$_{0.7}$ | 205 |
| 52 | ZrV$_{0.4}$Ni$_{1.0}$Fe$_{0.3}$Mn$_{0.3}$ | 219 |
| 53 | ZrV$_{0.2}$Ni$_{1.3}$Ce$_{0.1}$Co$_{0.1}$Fe$_{0.2}$ | 200 |
| 54 | ZrV$_{0.2}$Ni$_{1.4}$Fe$_{0.4}$ | 141 |
| 55 | TiV$_{0.4}$Ni$_{1.0}$Fe$_{0.3}$Mn$_{0.3}$ | 146 |
| 56 | Zr$_{0.4}$V$_{0.3}$Ni$_{1.0}$Fe$_{0.5}$ | 84 |
| 57 | ZrV$_{0.1}$Ni$_{1.3}$Fe$_{1.9}$ | 108 |

More specifically, ferrovanadiums and other materials were weighed and mixed to provide the compositions shown in Table 8 and were directly melted in an argon-arc melting furnace to form alloys. Hydrogen storage capacities of these alloys were measured from ordinary P-C-T characteristics to obtain the results shown in Table 8. It will be seen that the storage capacities are greater than those of prior art alloys. Other characteristics such as reaction speed also were found to be excellent.

Alloys produced by conventional production methods are also shown as Nos. 54 to 57 for the purpose of comparison. These alloys showed inferior homogeneity and deviation of composition, and considerably smaller values of hydrogen storage capacity as shown in Table 9, though these comparison alloys were of similar type to that of the alloys produced by the method of the invention.

Thus, the method of the invention for producing a hydrogen-storing alloy from a ferrovanadium containing Fe and V as the starting material was confirmed to be simpler than prior art methods and to be able to provide much higher degree of homogeneity, as well as superior hydrogen storage, holding and transportation characteristics, as compared with alloys produced by conventional method which employed single substances of Fe and V as the starting materials.

The present inventors compared and evaluated the alloys produced by the method of the invention from the viewpoint of hydrogen storage/release capacity, in order to find the optimum composition.

As a result, the inventors have found that the best results are obtained when the alloy composition falls within a range which is expressed by a general formula of Zr$\alpha$V$\beta$Ni$\gamma$M$\delta$, [where $\alpha$, $\beta$, $\gamma$ and $\delta$ represent atomic ratios of Zr, V, Ni and M, satisfying the conditions of $\alpha=0.5$ to 1.5, $\beta=0.03$ to 1.2, $\gamma=0.4$ to 2.5 and $\delta=0.01$ to 1.8, $\beta+\gamma+\delta=1.2$ to 3.7, while M represents one selected from the group consisting of: a single substance of Fe; and Fe and at least one selected from the group consisting of Mg, Ca, Y, Hf, Nb, Ta, Cr, Mo, W, Mn, Co, Pd, Cu, Ag, Au, Zn, Cd, Zl, Si, In, Sn, Bi, La, Ce, Mm, Pr, Nd, Th and Sm].

Alloys having the atomic ratio $\beta$ smaller than 0.01 or greater than 1.2 showed rather small amount of release of hydrogen, though considerably large values of hydrogen storage capacity were observed. Alloys having the atomic ratio $\delta$ smaller than 0.01 or greater than 1.8 showed somewhat small values of hydrogen release amounts. Alloys having atomic ratio $\alpha$ smaller than 0.5 showed somewhat inferior hydrogen storage capacity, while Alloys having atomic ratio $\alpha$ smaller than 0.5 showed somewhat inferior hydrogen storage capacity, while Alloys having atomic ratio $\alpha$ greater than 1.5 showed comparatively small value of hydrogen release amount. Alloys having atomic ratio $\gamma$ smaller than 0.4 showed inferior durability against repetition of hydrogen storage/release cycles, while alloys having atomic ratio $\gamma$ greater than 2.5 showed somewhat small value of hydrogen storage capacity. Alloys with values ($\beta+\gamma+\delta$) smaller than 1.2 or greater than 3.7 respectively showed rather inferior hydrogen release amounts and rather inferior hydrogen storage capacities. The reasons of these facts are shown below. The Zr content $\alpha$ and the V content $\beta$ are factors which affect particularly the hydrogen storage capacity. The greater the Zr and V contents, the greater the hydrogen storage capacity. Zr and V, however, form stable hydrogen compounds and, therefore, exhibits a smaller hydrogen release rate and, hence, smaller hydrogen release amount. The Ni content is a factor which affects particularly the storage/release cycle (durability). The greater the Ni content, the longer the life. A too large Ni content, however, tends to reduce hydrogen storage capacity. The content $\delta$ of M relates specifically to the storage/release cycle and the release pressure. Both the storage/release cycle and the release pressure were improved by an increase in the M content, but the hydrogen storage capacity was reduced as a result of the increase in the M content. It was also confirmed that the use of Fe as an essential element provides higher meltability and homogeneity of alloys, as well as industrial and economical advantages due to its low price.

EXAMPLE 7

Alloys of compositions of shown in Table 9 were prepared by selecting, among AB$\alpha$ type alloys, alloys expressed by a general formula of Zr$\alpha$V$\beta$Ni$\gamma$M$\delta$, [where $\alpha$, $\beta$, $\gamma$ and $\delta$ represent atomic ratios of Zr, V, Ni and M, satisfying the conditions of $\alpha=0.5$ to 1.5, $\beta=0.01$ to 1.2, $\gamma=0.4$ to 2.5 and $\delta=0.01$ to 1.8, $\beta+\delta+\delta=1.2$ to 3.7, while M represents one selected from the group consisting of: a single substance of Fe; and Fe and at least one selected from the group consisting of Mg, Ca, Y, Hf, Nb, Ta, cr, Mo, W, Mn, Co, Pd, Cu, Ag, Au, Zn, Cd, Al, Si, In, Sn, Bi, La, Ce, Mm, Pr, Nd, Th and Sm], using, as the starting materials, commercially available ferrovanadiums and other elements such as Zr, Ni, Ti, Hf, Ta, Y, Ca, Mg, La, Ce, Mm, Nb, Nd, Sm, Mo, Al, Si, V, Cr, Mn, Fe, Co, Cu, Zn, Si, Nb, Mo, W and Cd.

As a result of analysis, it was found that the alloys Nos. 58 to 63 among the alloys shown in Table 9 have main alloy phases of C14 or C15 Lavas phase. These alloys showed almost no deviation of composition. Furthermore, these alloys showed greater values of hydrogen storage capacity than conventional alloys when evaluated through measurement of ordinary P-C-T characteristics with hydrogen gas. Characteristics such as reaction speed and equilibrium pressure hysteresis also were found to be superior.

Alloys Nos. 64 to 68 are conventional alloys used as materials of hydrogen-storing electrodes. These alloys do not meet the requirements of the invention: namely, the alloys phases of these comparison sample alloys did not belong to Lavas phase of intermetallic compound with a crystalline structure of hexagon-symmetrical C14 type with crystalline lattice constants of a=4.8 to 5.2 Å (Angstrom) and c=7.9 to 8.3 and or cubic-symmetrical C15 type with crystalline lattice constant of a=6.92 to 7.70. More specifically, the alloy No. 64 had a too large atomic ratio of V, the alloy No. 65 had a too small atomic ratio of Zr, the alloy No. 66 had a too small atomic ratio of Ni and the alloy No. 67 had a too large atomic ratio of M. The alloy No. 68 had the same alloy composition as the alloy No. 58 but was prepared by a process which did not use ferrovanadium.

Performance of these alloys, when used as negative electrodes of alkali storage batteries, were evaluated through semi-battery test of the negative electrodes. The evaluation method and the results are shown in FIG. 1, as well as in the following description.

Each alloy produced by melting was pulverized into particles of particle size below 300 meshes. 5 g of this particulated alloy was mixed with 0.5 g of polyethylene powder as the binder and 2 g of carbonyl nickel as a conducting agent. The mixture was sufficiently stirred and blended and was applied around a nickel mesh (wire diameter 0.2 mm, 16 mesh) which was used as a core conductor, and was then pressed into a tabular form. The alloy in the tabular form was heated at 120° C. in a vacuum so as to melt and remove polyethylene, and then a lead was connected to the tabular alloy thus completing a hydrogen-storing alloy.

In order to evaluate the performance of the alloy as the negative electrode of a secondary battery, sintered nickel plates used in commercially available nickel-cadmium battery were used as positive electrodes (opposite electrodes) and were combined with the hydrogen-storing alloy negative electrodes such that the amounts of the positive electrodes were excess of those of the negative electrodes in terms of electricity capacity. Batteries were formed with those pairs of electrodes, using non-woven polyamide cloths as separators and using an electrolyte which was prepared by adding 20 g/l of lithium hydroxide to an aqueous solution of caustic potash having a specific gravity of 1.30. The batteries were subjected to repeated charging and discharging with constant electrical current at 20° C. The amount of electricity charged was 500 mA×5 hours, while discharge was conducted at 30 mA with a voltage below 0.8 V being cut.

Table 9 shows the discharge capacitances in the open systems as observed in 10th charging/discharging cycles, while FIG. 1 shows the charging/discharging cycle life characteristics. More specifically, in FIG. 1, the axis of abscissa represents the number ($\infty$) of the charging/discharging cycles, while axis of ordinate represents the discharging capacity per 1 g in the open system as observed in the batteries having negative electrodes made of alloys of the invention, together with the characteristics obtained with unacceptable alloys (Table 9). The numbers (Nos.) allocated to the batteries shown in FIG. 1 correspond to the Nos. of alloys shown in Table 9. From the comparison between the alloy No. 58 and the alloy No. 68, as well as from the comparison between the alloys Nos. 58 to 63 and the alloys Nos. 64 to 67, it will be seen that the hydrogen-storing alloys of the present invention have greater values of discharge capacities, as well as superior durability (cycle life characteristics), as compared with conventional alloys. Superiority in quick charging/discharging characteristics also was confirmed.

TABLE 9

| Alloy No. | Alloy Composition | Amount of discharge after 10 cycles (mAh/g) |
|---|---|---|
| 58 | $ZrV_{0.2}Ni_{1.4}Fe_{0.4}$ | 346 |
| 59 | $ZrV_{0.3}Ni_{1.3}Fe_{0.2}$ | 355 |
| 60 | $Zr_{1.2}V_{0.6}Ni_{1.2}Fe_{0.2}$ | 344 |
| 61 | $Zr_{0.7}V_{0.9}Ni_{1.2}Fe_{0.7}$ | 328 |
| 62 | $ZrV_{0.4}Ni_{1.0}Fe_{0.3}Mn_{0.3}$ | 358 |
| 63 | $ZrV_{0.2}Ni_{1.3}Ce_{0.1}Co_{0.1}Fe_{0.2}$ | 338 |
| 64 | $ZrV_{1.3}Ni_{0.9}Fe_{1.5}$ | 197 |
| 65 | $Zr_{0.4}V_{0.3}Ni_{1.0}Fe_{0.5}$ | 144 |
| 66 | $ZrV_{0.5}Ni_{0.3}Fe_{1.0}$ | 199 |
| 67 | $ZrV_{0.5}Ni_{1.3}Fe_{1.9}$ | 185 |
| 68 | $ZrV_{0.2}Ni_{1.3}Fe_{0.4}$ | 298 |

Many alloy compositions for hydrogen-storing electrodes are obtainable by the production method of the invention in addition to those shown in Table 9. The alloy phases of those alloys substantially belonged to Lavas phase of intermetallic compound having a crystalline structure of hexagon-symmetrical C14 type with crystalline lattice constants of a=4.8 to 5.2 and c=7.9 to 8.3 and/or cubic-symmetrical C15 type with crystalline lattice constant of a=6.92 to 7.70.

The inventors have found that the best results are obtained when the alloy composition falls within a range which is expressed by a general formula of $Zr\alpha V\beta Ni\gamma M\delta$], where $\alpha$, $\beta$, $\gamma$ and $\delta$ represent atomic ratios of Zr, V, Ni and M satisfying the conditions of $\alpha=0.5$ to 1.5, $\beta=0.01$ to 1.2, $\gamma=0.4$ to 2.5 and $\delta=0.01$ to 1.8, $\beta+\gamma+\delta=1.2$ to 3.7, while M represents one selected from the group consisting of: a single substance of Fe; and Fe and at least one selected from the group consisting of Mg, Ca, Y, Hf, Nb, Ta, Cr, Mo, W, Mn, Co, Pd, Cu, Ag, Au, Zn, Cd, Al, Si, In, Sn, Bi, La, Ce, Mm, Pr, Nd, Th and Sm].

Alloys having the atomic ratio $\beta$ smaller than 0.01 or greater than 1.2 showed rather small amount of release of hydrogen, though considerably large values of hydrogen storage capacity were observed. Alloys having the atomic ratio $\delta$ smaller than 0.01 or greater than 1.8 showed somewhat small values of hydrogen release amounts Alloys having atomic ratio $\alpha$ smaller than 0.5 showed somewhat inferior hydrogen storage capacity, while alloys having atomic ratio $\alpha$ greater than 1.5 showed comparatively small value of hydrogen release amount. Alloys having atomic ratio $\gamma$ smaller than 0.4 showed inferior durability against repetition of hydrogen storage/release cycles, while alloys having atomic ratio $\gamma$ greater than 2.5 showed somewhat small value of hydrogen storage capacity. Alloys with values $(\beta+\gamma+\delta)$ smaller than 1.2 or greater than 3.7 respectively showed rather inferior hydrogen release amounts and rather inferior hydrogen storage capacities. The reasons of these facts are shown below. The Zr content $\alpha$ and the V content $\beta$ are factors which affect particularly the hydrogen storage capacity. The greater the Zr and V contents, the greater the hydrogen storage capacity. Zr and V, however, form stable hydrogen compounds and, therefore, exhibits a smaller hydrogen release rate and, hence, smaller hydrogen release amount. The Ni content is a factor which affects particularly the storage/release cycle (durability). The greater the Ni content, the longer the life. A too large Ni content, however, tends to reduce hydrogen storage capacity. The content $\delta$ of M relates specifically to the storage/release cycle and the release pressure. Both the storage/release cycle and the release pressure were improved by an increase in the M content, but the hydrogen storage capacity was reduced as a result of the increase in the M content. It was also confirmed that the use of Fe as an essential element provides higher meltability and homogeneity of alloys, as well as industrial and economical advantages due to its low price.

The hydrogen-storing alloys, formed by using a ferrovanadium containing Fe and V as the starting material, exhibited very high degree of homogeneity, and hydrogen-storing electrodes making use of these alloys as the major component exhibit superior performance when used as negative electrodes of an alkali batteries, as compared with alloys formed by the conventional process which makes use of single substances of Fe and V as the starting materials.

EXAMPLE 8

A U2 type cylindrical hermetic nickel-hydrogen secondary batteries were produced using the abovementioned hydrogen-storing alloy electrodes and thus formed batteries were evaluated. As in the case of the single-electrode test mentioned before, the alloy was pulverized into particles of a particle size below 300 meshes, and was mixed with a binder such as polyvinyl alcohol, whereby a paste was formed. The paste was applied to a punching metal plate plated with nickel and was then dried. The plate was then slitted into strips of 3.9 cm wide and 26 cm long, and lead plates were spot-welded to predetermined portions on the strip thus forming hydrogen-storing alloys. Known foamed nickel electrodes, in the form of strips of 3.9 cm wide and 22 cm long, were used as the opposing electrodes. A polyamide non-woven cloth was used as separators, together with an electrolyte which was formed by adding 20 g/l of lithium hydroxide to an aqueous solution of caustic potash having a specific gravity of 1.20. The nominal capacity was 3.0 Ah.

Figure 2:
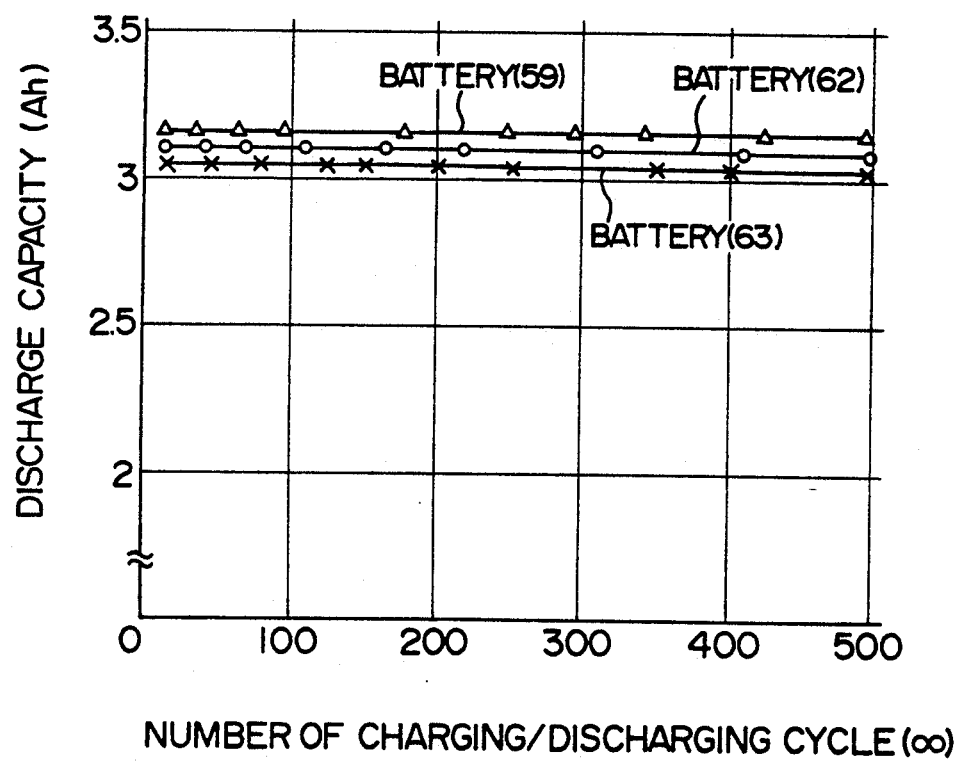
FIG. 2 is a diagram showing discharge cycle life characteristic of batteries having negative electrodes made of various examples of the alloy produced by the method of the present invention.

The evaluation was conducted by subjecting these batteries to charging/discharging cycles repeated at 20° C. The charging was conducted for 15 hours at 0.1 C (10-hour charging rate), while the discharging was conducted at 0.2 C (5-hour discharge rate) until the voltage is reduced to the final voltage of 0.9 V. The results of this test are shown in FIG. 2. The Nos. of the batteries appearing in FIG. 2 correspond to the Nos. of alloys shown in Table 2. The batteries incorporating electrodes made of the hydrogen-storing alloys of the invention maintained discharge capacities of about 3.0 to 3.2 Ah and did not show any degradation in the performance even after 500 charging/discharging cycles.

Industrial Applicability:

The alloys produced by the method of the present invention, as well as electrodes made from such alloys, exhibit high degrees of homogeneity and reduced fluctuation in quality between lots, thus offering high stability of quality and high reliability. In addition, the price of the alloy is low by virtue of low material cost and simplified production process. Consequently, the present invention provides alloys which are superior in various characteristics such as hydrogen storage/release characteristics and cycle life, as well as oxidation resistance. Thus, the alloys produced by the method of the present invention find various industrial uses such as storage, holding and transportation of hydrogen, elements of a heat pump, elements of alkali batteries (nickel-hydrogen battery) and so forth, thus offering great industrial advantages.

We claim:

1. A method of producing a hydrogen-storing alloy using zirconium compounds, comprising:
combining at least one ferrozirconium compound with at least one element to create a composition;
melting the composition, and
solidifying the melted composition to obtain a hydrogen-storing alloy expressed by the formula AB$\alpha$, wherein A represents at least one member selected from the group consisting of Zr, HF, Ta, Y, Ca, Mg, La, Ce, Pr, Nb, Nd, Mo, Al, and Si and wherein B represents a member selected from the group consisting of: a single substance Fe; and Fe and at least one member selected from the group consisting of V, Ni, Co, C, Zn, Al, Si, Nb, Mo, W, Mg, Ca, Y, Ta, Pd, Ag, Au, Cd, In, Sn, Bi, La, Ce, Pr, Nd, Th, Sm, and a mixture of rare earth elements, $\alpha$ represents a value of from 1.5 to 2.5 and A and B are different elements, and wherein the alloy phase consists essentially of Lavas phase of intermetallic compound.

2. A method of producing a hydrogen-storing alloy according to claim 1 wherein said hydrogen-storing alloy or its hydrogenated product is expressed by the formula Zr$_\alpha$Ni$_\gamma$M$_\delta$ wherein $\alpha$, $\gamma$ and $\delta$ represent atomic ratios of Zr, Ni and M, satisfying the conditions $\alpha=0.5$ to 1.5, $\gamma=0.4$ to 2.5 and $\delta=0.01$ to 1.8, $\gamma+\delta=1.2$ to 3.7, M represents a member selected from the group consisting of: a single substance of Fe; and Fe and at least one member selected from the group consisting of V, Mg, Ca, Y, Hf, Nb, Ta, Mo, W, Mn, Co, Pd, Cu, Ag, Au, Zn, Cd, Al, Si, In, Sn, Bi, La, Ce, Pr, Nd, Th and Sm and a mixture of rare earth elements.

3. A method of making a hydrogen-storing alloy according to claim 1 wherein said ferrozirconium compound is commercially available ferrozirconium alloys A and B or commercially available ferrozirconium alloy A or B; and commercially available ferrozirconium alloy A contains not less than 80.0% Zr and commercially available ferrozirconium alloy B contains not less than 50.0% Zr.

4. A method of producing a hydrogen-storing alloy which comprises:

combining at least one ferrozirconium alloy with at least one member selected from the group consisting of Zr, Ni, Hf, Ta, Y, Ca, Mg, La, Ce, Nd, Sm, Al, Si, V, Mn, Fe, Co, Cu, Zn, Si, Nb, No, W, Ce and a mixture of rare earth elements to create a composition;

melting said composition; and solidifying the melted composition to obtain the hydrogen-storing alloy, wherein said hydrogen-storing alloy or its hydrogenated product is expressed by the formula $Zr_\alpha Ni_\gamma M_\delta$ wherein $\alpha$, $\gamma$ and $\delta$ represent atomic ratios of Zr, Ni, and M, satisfying the conditions $\alpha = 0.5$ to $1.5$, $\gamma = 0.4$ to $2.5$ and $\delta = 0.01$ to $1.8$, $\gamma + \delta = 1.2$ to $3.7$, M represents a member selected from the group consisting of: a single substance Fe; and Fe and at least one member selected from the group consisting of V, Mg, Ca, Y, Hf, Nb, Ta, Cr, Mo, W, Mn, Co, Pd, Cu, Ag, Au, Zn, Cd, Al, Si, In, Sn, Bi, La, Ce, Pr, Nd, Th and Sm and a mixture of rare earth elements.

5. A method of making a hydrogen-storing electrode comprising melting together starting materials capable of forming a hydrogen-storing alloy, solidifying the melt, grinding the solidified melt to form smaller solids and applying the smaller solids and a binder to a support, wherein said starting materials comprise one or more ferrozirconium alloys and one or more members selected from the group consisting of Zr, Ni, Hf, Ta, Y, Ca, Mg, La, Ce, Nd, Sm, Al, Si, V, Mn, Fe, Co, Cu, Zn, Si, Nb, No, W, Cd and a mixture of rare earth elements.

6. A method of making a hydrogen-storing alloy wherein said hydrogen-storing alloy or its hydrogenated product is expressed by the formula $Zr_\alpha Ni_\gamma M_\delta$ wherein $\alpha = 0.5$ to $1.5$, $\gamma = 0.4$ to $2.5$ and $\delta = 0.01$ to $1.8$, $\gamma + \delta = 1.2$ to $3.7$, and M represents a member selected from the group consisting of:

a single substance of Fe; and fe and at least one member selected from the group consisting of V, Mg, Ca, Y, Hf, Nb, Ta, Mo, W, Mn, Co, Pd, Cu, Ag, Au, Zn, Cd, Al, Si, In, Sn, Bi, La, Ce, Pr, Nd, Th and Sm and a mixture of rare earth elements, the method comprising:

combining either commercially available ferrozirconium alloys A and B or ferrozirconium alloy A or B with elements sufficient to obtain a composition capable of forming the hydrogen-storing alloy $Zr_\alpha Ni_\gamma M_\delta$ wherein $\alpha$, $\gamma$, $\delta$ and m are as recited above;

melting said composition; and solidifying the melted composition to obtain the hydrogen-storing alloy, said commercially available ferrozirconium alloy A contains not less than 80.0% Zr and commercially available ferrozirconium B contains not less than 50.0% Zr.

* * * * *